United States Patent
Sakagami et al.

(10) Patent No.: US 7,035,712 B2
(45) Date of Patent: Apr. 25, 2006

(54) NUMERICAL CONTROL DEVICE

(75) Inventors: Makoto Sakagami, Tokyo (JP); Masaki Ryu, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/505,981

(22) PCT Filed: Oct. 30, 2002

(86) PCT No.: PCT/JP02/11297

§ 371 (c)(1),
(2), (4) Date: Aug. 27, 2004

(87) PCT Pub. No.: WO2004/040385

PCT Pub. Date: May 13, 2004

(65) Prior Publication Data

US 2005/0149224 A1    Jul. 7, 2005

(51) Int. Cl.
G06F 19/00     (2006.01)
G05B 19/416    (2006.01)

(52) U.S. Cl. .................. 700/188; 700/181
(58) Field of Classification Search ............ 700/188, 700/180, 86, 87, 181, 195, 189; 318/570, 318/571
See application file for complete search history.

(56) References Cited

U.S. PATENT DOCUMENTS 4,740,901 A * 4/1988 Otsuki ............... 700/195
5,485,069 A * 1/1996 Otsuki et al. ........ 318/570

FOREIGN PATENT DOCUMENTS

| JP | 56-42807 A | 4/1981 |
| JP | 60-63605 A | 4/1985 |
| JP | 8-112739 A | 5/1986 |
| JP | 2-45807 A | 2/1990 |
| JP | 2-109659 A | 4/1990 |
| JP | 08-50506 | * 2/1996 |

* cited by examiner

Primary Examiner—Leo Picard
Assistant Examiner—Steven R. Garland
(74) Attorney, Agent, or Firm—Sughrue Mion, PLLC

(57) ABSTRACT

To provide a numerical control apparatus 1 provided with a plurality of skip signals (external signals), in which a processing program is easily fabricated even in the case where the tool is moved to the final specified position by decreasing stepwise, or increasing or decreasing stepwise the speed, every time a skip signal is input into the numerical control apparatus 1. The numerical control apparatus 1 comprises, in one block of a numerical control processing program, a skip command capable of issuing a plurality of optional feed speed commands for commanding an optional feed speed different from a feed speed by a normal feed command in the one block, the plurality of optional feed speed commands corresponding to a plurality of skip signals input from the outside, and an interpolation processing part 12 and an axis control processing part 13 for making the acceleration and deceleration control upon an input of the plurality of skip signals when the skip command is given.

4 Claims, 5 Drawing Sheets

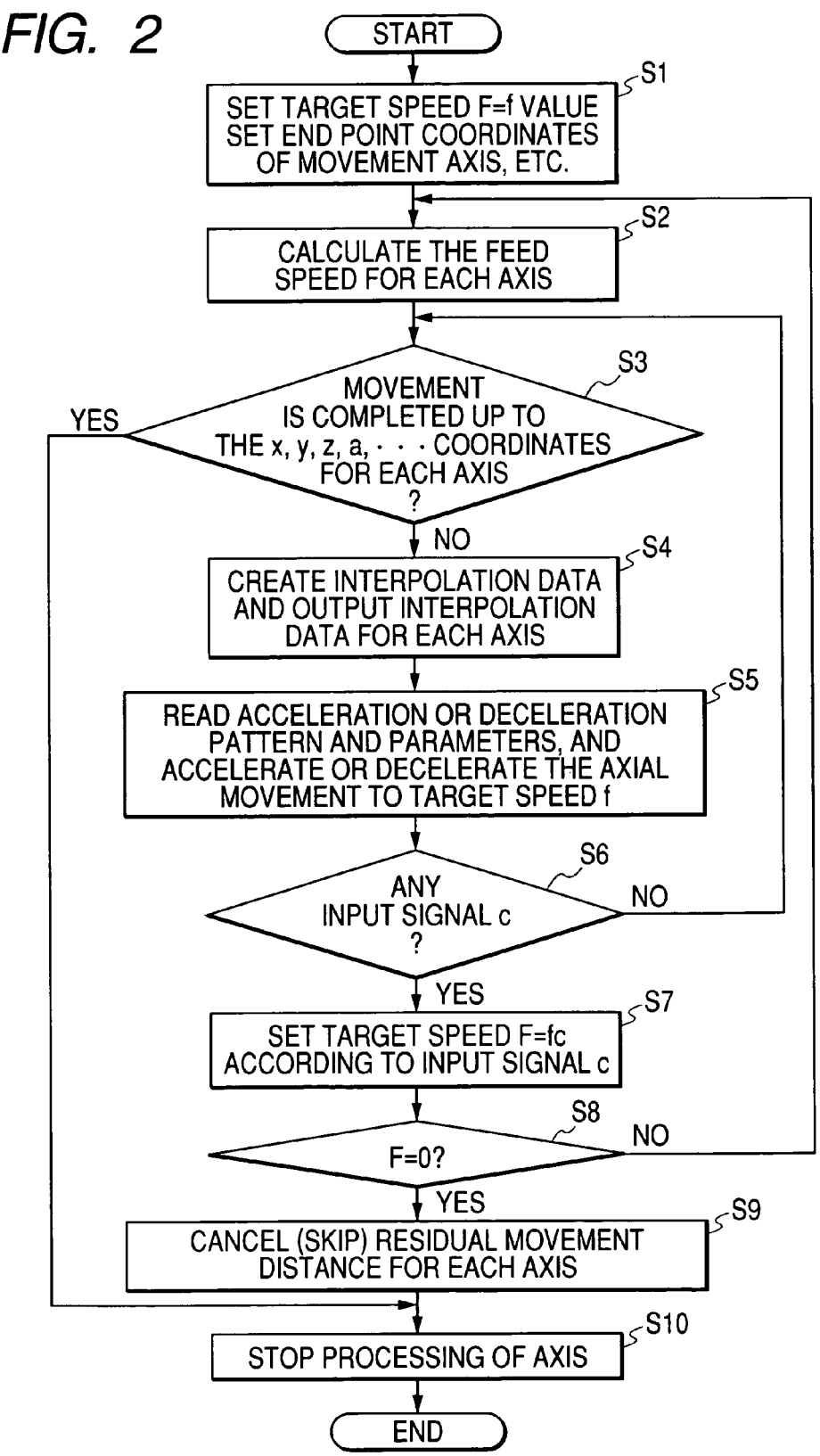

NUMERICAL CONTROL DEVICE

TECHNICAL FIELD

The present invention relates to a numerical control apparatus that performs a skip function.

BACKGROUND ART

The numerical control apparatus performs a numerical control processing based on a processing program registered in memory or externally input via the tape, communication or FLD (floppy disk), and drives the machine tool in accordance with the processing result to machine a workpiece. This numerical control apparatus has the feature that performs the skip function.

This skip function is effected upon a command from the processing program such as G31 Xx Yy Zz Ff;

(X, Y, Z: axial addresses, x, y, z: coordinate values, Ff: feed speed command). If a skip signal is entered from the outside during the linear interpolation by the G31 command, the machine feed is promptly stopped to discard the residual distance, and the next block is executed.

By the way, in the case where a plurality of skip signals (external signals) are provided, and every time a skip signal is input into the numerical control apparatus, the tool is moved to the final specified position by decreasing stepwise, or increasing or decreasing stepwise the speed, the skip function is employed.

However, the conventional numerical control apparatus could only perform a skip command in which one block can deal with one skip signal. Therefore, in the case where a plurality of skip signals were provided, and every time a skip signal (external signal) was input into the numerical control apparatus, it was desired to decrease stepwise, or increase or decrease stepwise the speed, it was required to divide the skip command into the blocks desired to change the speed, in which the skip command was issued for each block.

In this case, because of the necessity of dividing the skip command into the blocks desired to change the speed, to effectuate the skip signal, it was required that a movement distance is calculated in advance to be included within its signal range (skip signal interval), and the skip command is issued in the movement range.

Therefore, in the case where it was desired to decrease stepwise, or increase or decrease stepwise the speed, every time the skip signal (external signal) is input into the numerical control apparatus, it took much labor to fabricate the processing program.

Also, if the skip signal is input, the residual distance for the block is canceled, so that the speed becomes "0". Therefore, it takes some time to initiate the next block, resulting in a problem that in the case where the tool is moved to the final specified position by decreasing stepwise, or increasing or decreasing stepwise the speed, every time the skip signal (external signal) is input into the numerical control apparatus, it takes a long time.

SUMMARY OF THE INVENTION

This invention has been achieved to solve the above-mentioned problems, and it is an object of the invention to provide a numerical control apparatus provided with a plurality of skip signals (external signals), in which a processing program is easily fabricated and the operation time is shortened, even in the case where the tool is moved to the final specified position by decreasing stepwise, or increasing or decreasing stepwise the speed, every time a skip signal is input into the numerical control apparatus.

In order to accomplish the above object, this invention provides a numerical control apparatus comprising, in one block of a numerical control processing program, a skip command capable of issuing a plurality of optional feed speed commands for commanding an optional feed speed different from a feed speed by a normal feed command in said one block, the plurality of optional feed speed commands corresponding to a plurality of skip signals input from the outside, and control means for making the acceleration and deceleration control upon an input of the plurality of skip signals when the skip command is given.

Also, the invention provides a numerical control apparatus comprising, in one block of a numerical control processing program, a normal feed speed command, the end point coordinates of a control axis, and a skip command capable of issuing a plurality of optional feed speed commands for commanding an optional feed speed different from a feed speed by the normal feed command in the one block, the plurality of optional feed speed commands corresponding to a plurality of skip signals input from the outside, and control means for making the acceleration and deceleration control upon an input of the plurality of skip signals when the skip command is given.

Also, the plurality of optional feed speed commands for commanding the optional feed speed different from the feed speed by the normal feed speed command designate a percentage of optional feed speed to the normal feed speed.

Moreover, a plurality of optional acceleration or deceleration parameters are given corresponding to the plurality of skip signals, and the control means makes the acceleration or deceleration control corresponding to the plurality of skip signals based on the given acceleration or deceleration parameters.

BRIEF DESCRIPTION OF THE DRAWINGS

FIG. 2 is a flowchart showing a skip related processing in the numerical control apparatus according to the embodiment 1 of the invention.

BEST MODE FOR CARRYING OUT THE INVENTION

Embodiment 1

Referring to FIGS. 1 to 5, an embodiment 1 of the present invention will be described below.

Figure 1:
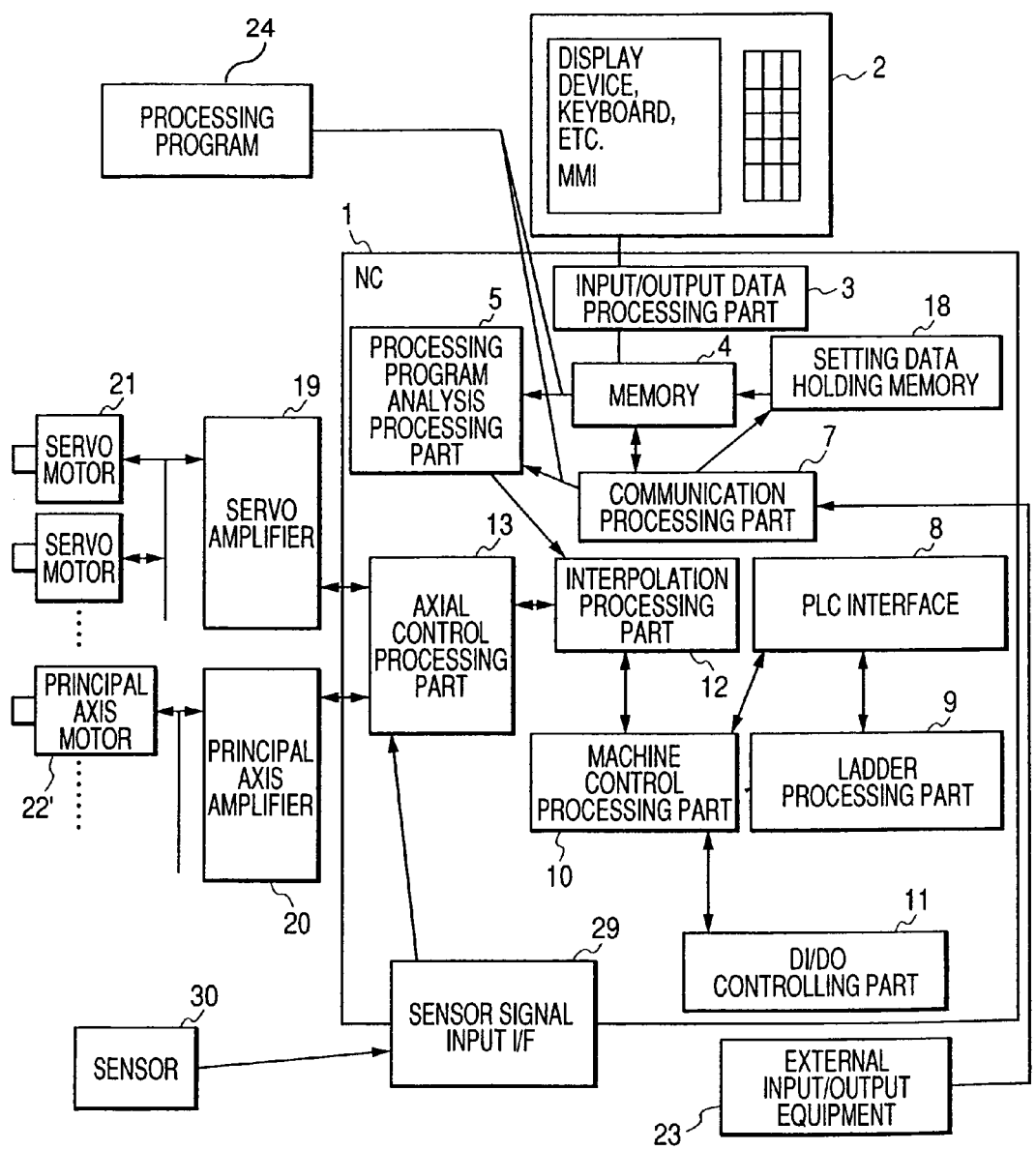
FIG. 1 is a block diagram of the essence showing a numerical control apparatus according to an embodiment 1 of the present invention.
Figure 4A:
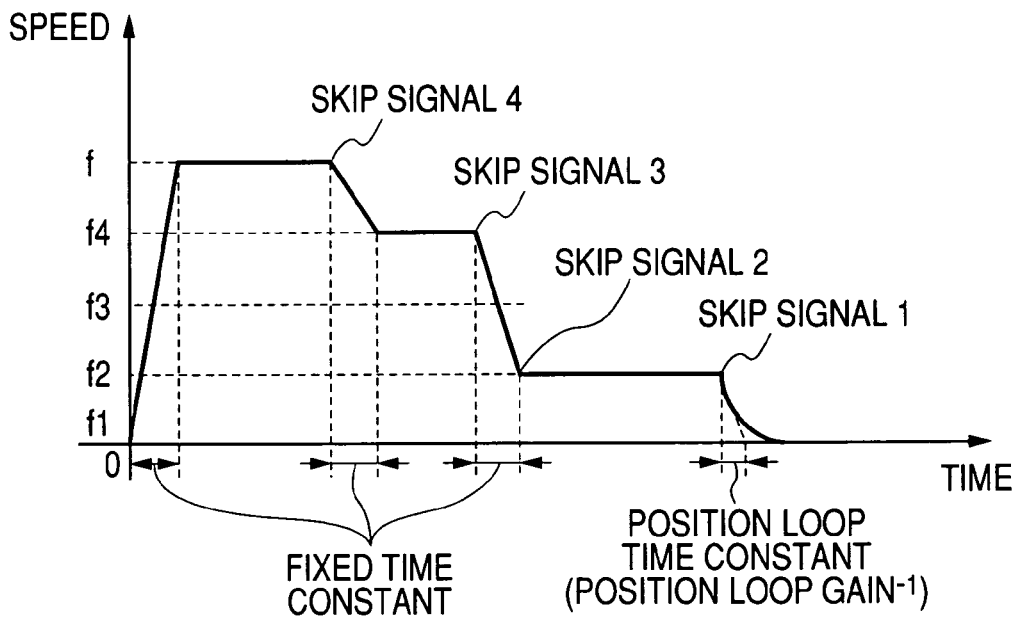
FIGS. 4A–4B are views showing a speed command waveform at the skip operation with a fixed time constant or a fixed slop in the numerical control apparatus according to the embodiment 1 of the invention.
Figure 4B:
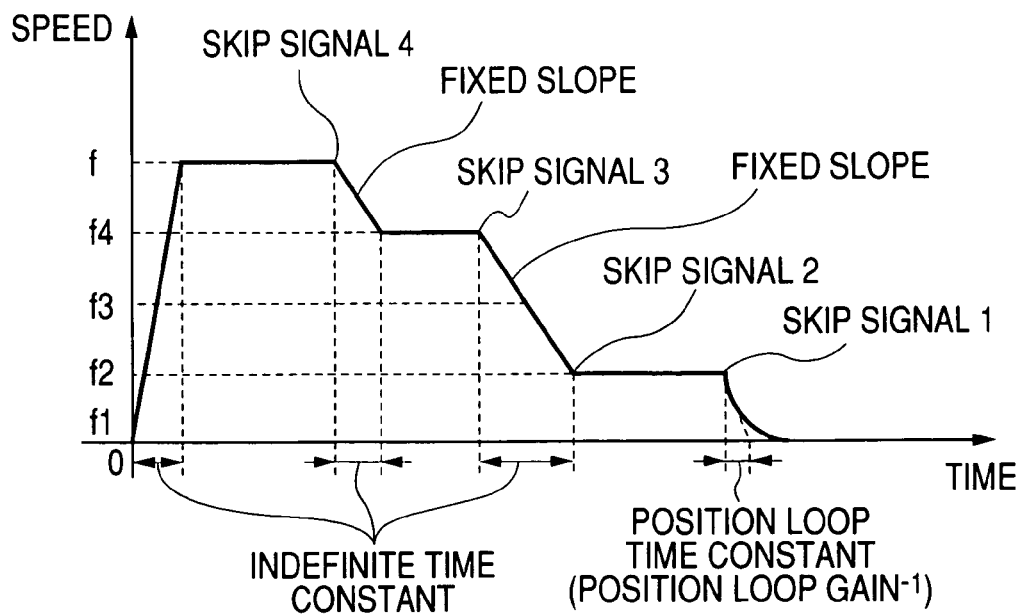
Figure 5:
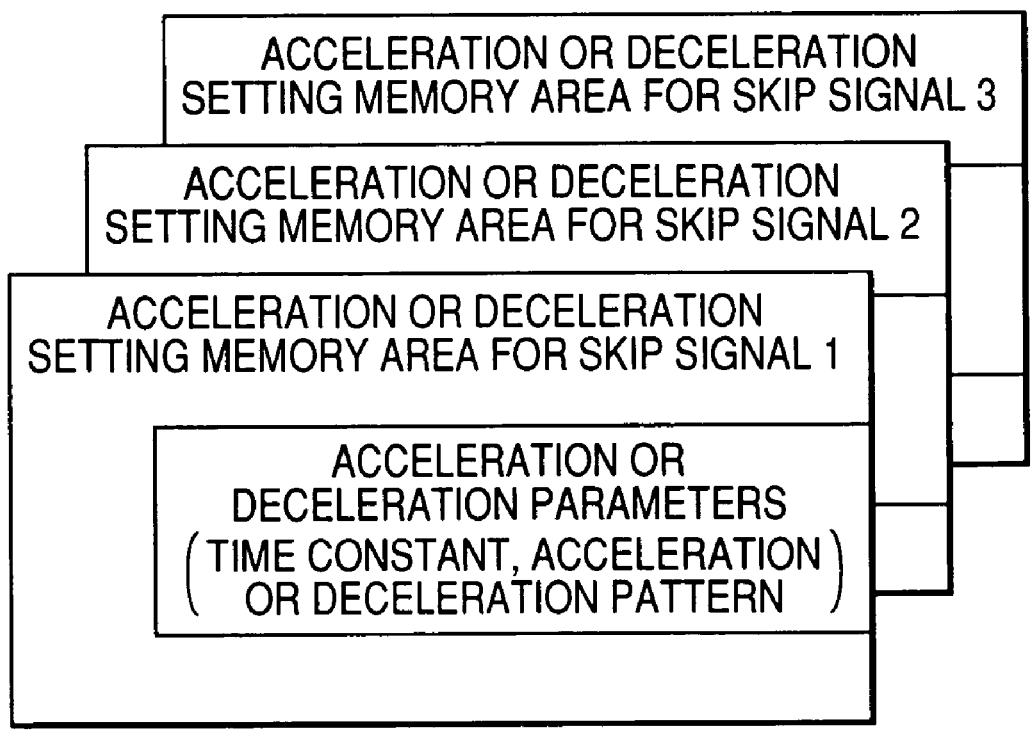
FIG. 5 is a view showing a setting state of acceleration or deceleration parameters in the numerical control apparatus according to the embodiment 1 of the invention.

FIG. 1 is a block diagram of the essence, FIG. 2 is a flowchart showing a skip related processing, FIG. 3 is a view showing a speed command waveform at the skip operation, FIG. 4 is a view showing a speed command waveform at the skip operation with a fixed time constant or a fixed slope, and FIG. 5 is a view showing a setting state of acceleration or deceleration parameters.

A numerical control apparatus of this embodiment 1 has the same internal processing flow as the conventional numerical control apparatus. That is, a processing program 24 or the setting data such as parameters input from an external input/output unit 23 via a man machine interface (MMI) 2 such as a display device or a keyboard is stored in a program memory 4 or a setting data holding memory 18 by an input/output data processing part 3 or a communication processing part 7, as shown in FIG. 1.

The processing program 24 stored in the program memory 4 or directly input from the external input/output unit 23 is analyzed by a processing program analysis processing part 5 in the same manner as conventionally.

An interpolation processing part 12 creates the axial interpolation data or a movement command based on data analyzed by a processing program analysis processing part 5. In this case, when the analysis data is a skip command as will be described later, the axial movement data is sent to the interpolation processing part 12, and it is notified to the axial control processing part 13 that the analysis data is the skip command.

When a sensor signal (skip signal) is input through a sensor signal input interface 29, the axial control processing part 13 performs the corresponding processings (canceling the residual movement distance, and calculating the movement distance to deal with the plural skip signals, as well as making the acceleration or deceleration processing for changing the axial movement speed, which are the features of this embodiment 1), and outputs the axial control data to a servo amplifier 19 and a principal axis amplifier 20 to drive a servo motor 21 and a principal axis motor 22.

Referring to FIG. 2, the detailed operation of the interpolation processing part 12 and the axial control processing part 13 will be described below.

Also, sensors (optical sensor, limit switch and so on) 30 for outputting a sensor signal (skip signal) are installed at predetermined locations as needed on the controlled machine. For example, a plurality of sensor signals are allocated to a sensor signal input interface 29 in such a way that a sensor signal input into the first pin of a sensor signal input interface 29 is a skip signal 1, a sensor signal input into the second pin is a skip signal 2 and so on, whereby plural sensor signals (skip signals) input into the numerical control apparatus are distinguishable.

Also, to control the acceleration or deceleration (acceleration or deceleration with a fixed time constant, or with a fixed slope) as shown in FIG. 4, a memory area as shown in FIG. 5, for holding the acceleration or deceleration parameters such as acceleration or deceleration pattern, time constant and slope is reserved in a setting data holding memory 18. A procedure for setting the acceleration or deceleration parameter data basically includes inputting the set data through the external input/output unit 23 and the communication processing part 7 and storing the set data in the set data holding memory 18, like the conventional procedure for setting the axial control parameters.

Also, in the case where data processed in the processing program analysis processing part 5 is an auxiliary command (M command), the data is passed to a machine control processing part 10 to control a machine (ATC control, coolant ON/OFF) under the action of a ladder processing part 9, a PLC interface 8 and a DI/DO controlling part (digital input/output controlling part) 11 in the same manner as conventionally.

Next, the format of the skip command issued in the processing program for use in the embodiment 1 will be described. That is, this skip command is basically issued in the following way.

$$Ggg\ Xx\ Yy\ Zz\ \alpha a\ Ff\ F1=f1\ F2=f2\ F3=f3\ \ldots\ Fn=fn;$$

Where Ggg is a skip command code (e.g., G31) in this embodiment 1,

X, Y, Z, $\alpha$: axial addresses, x, y, z, a: coordinate values,

Ff: feed speed command at the start of cutting feed, in which F is address for commanding the feed speed at the start of cutting feed and f is feed speed command value (mm/min) at the start of cutting feed.

F1: address commanding the feed speed corresponding to skip signal 1 f1: feed speed command value (mm/min) commanded at the input of skip signal 1

F2: address commanding the feed speed corresponding to skip signal 2 f2: feed speed command value (mm/min) commanded at the input of skip signal 2

F3: address commanding the feed speed corresponding to skip signal 3 f3: feed speed command value (mm/min) commanded at the input of skip signal 3

Fn: address commanding the feed speed corresponding to skip signal n fn: feed speed command value (mm/min) commanded at the input of skip signal n That is, the skip command issued in the processing program for use in this embodiment 1 is in the format in which the speed change is commanded corresponding to plural skip signals, so that the processing program for changing freely the movement speed till stopping the axis by inputs from the sensors 30 may be easily produced.

When the input values of f1, f2, . . . , fn are "0", the axis is promptly stopped, and the residual movement distance is canceled in the same manner as the conventional skip function.

Figure 3A:
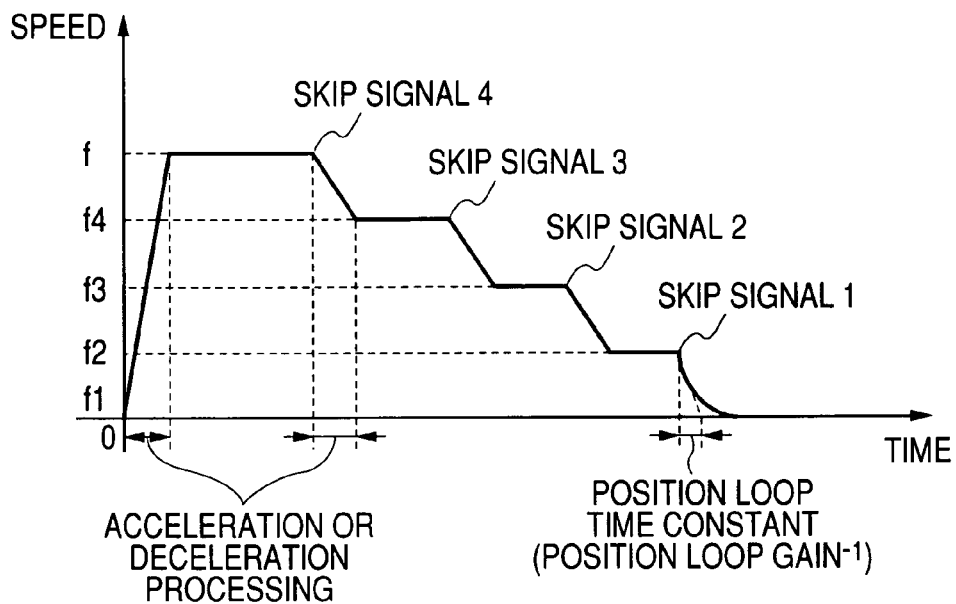
FIGS. 3A–3B are views showing a speed command waveform at the skip operation in the numerical control apparatus according to the embodiment 1 of the invention.

A common usage of the skip command according to the embodiment 1 includes decelerating the axial movement nearer to the stop position with the faster axial movement from the position farther away from the expected stop position, as shown in FIG. 3A, for example. In this case, the command format is as follows.

$$Ggg\ Xx\ Yy\ Zz\ Ff\ F4=f4\ F3=f3\ F2=f2\ F1=f1; \quad (1)$$

Where f>f4>f3>f2, f1=0, and F1, F2, F3, F4 correspond to skip signals 1 to 4, respectively.

That is, for a plurality of sensors 30 that are installed along a direction far away from the expected stop position to come closer to the stop position, where the movement speed of sensor in starting to move is f, and enabled to output skip signals 4, 3, 2, 1 in the order of larger numerical values from the position farthest away from the stop position, like the previous skip command, the movement speeds (f4, f3, f2, f1) corresponding to the numbers are specified from higher to lower values. Also, the movement speed corresponding to the number of sensor 30 located at the expected stop position is set to "0". With the command given in this manner, the axial movement is promptly stopped by the sensor at the stop position while changing the axial movement speed, corresponding to the plurality of sensors 30, and the axial residual movement distance is canceled.

Figure 3B:
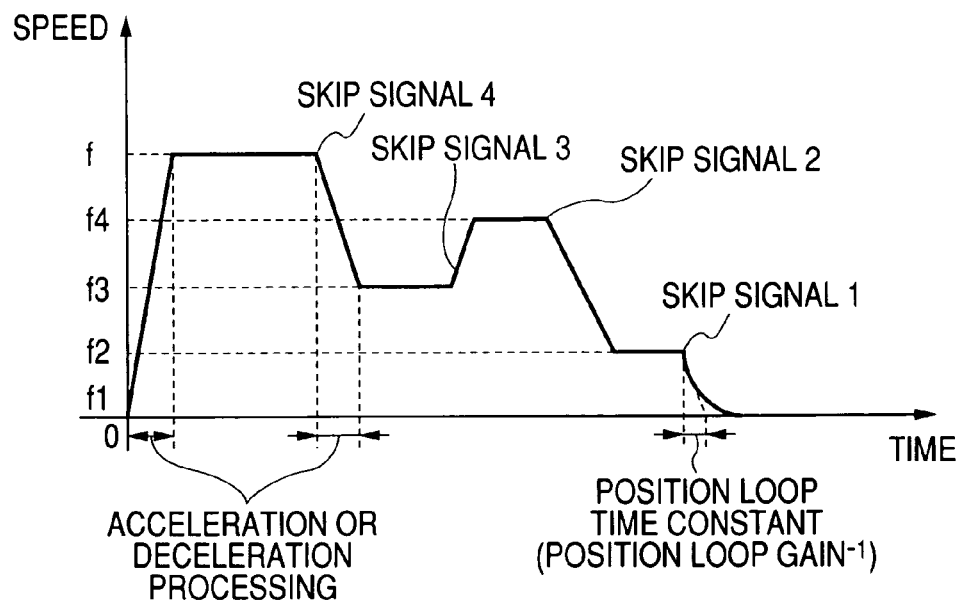

Also, when acceleration or deceleration is made on the course to the stop position, as shown in FIG. 3B, for example, the command format is as follows.

$$\text{Ggg Xx Yy Zz Ff F4=f3 F3=f4 F2=f2 F1=f1;} \quad (2)$$

Where f>f4>f3>f2, f1=0, and F1, F2, F3, F4 correspond to skip signals 1 to 4, respectively.

Also, the skip command according to this embodiment 1 is arbitrarily set, like the skip command (3), but does not need to be specified in the order of sensor number like the skip command (1). Also, the skip signal for stopping the axial movement may be specified lastly or allocated to any sensor number.

$$\text{Ggg Xx Yy Zz αa Ff F2=f2 F1=f1 F3=f3 . . .}$$
$$\text{Fn=fn;} \quad (3)$$

Where f1, f2, fn≠0, f3=0, and F1, F2, F3, Fn correspond to skip signals 1 to n, respectively.

Further, the skip command according to the embodiment 1 is allocated to a plurality of axial stop skip signals, like the skip command (4). In this case, the axial stop occurs in accordance with the axial stop skip signal input previously.

$$\text{Ggg Xx Yy Zz αa Ff F1=f1 F2=f2 F3=f3 . . .}$$
$$\text{Fn=fn;} \quad (4)$$

Where f1, f3≠0, f2, fn=0, and F1, F2, F3, Fn correspond to skip signals 1 to n, respectively.

In this connection, f1, f2, . . . , fn are not actual speed command values (mm/min), but may be the increase or decrease rate commands for the feed speed command Ff at the start of cutting feed, for example, the "%" command values indicating at what percent the speed is increased or decreased for the feed speed command Ff at the start of cutting feed.

The skip command in the processing program for use in this embodiment 1 is given in the above format.

Referring mainly to FIG. 2, the skip processing in the interpolation processing part 12 and the axial control processing part 13 will be described below.

That is, the skip command is analyzed by the processing program analysis processing part 5, and the resultant speed f of the specified movement speed of each movement axis, the movement end points (x, y, z, a) of each axis, skip command control flag, and other necessary conditions for axial movement, are passed to the interpolation processing part 12 in the same manner as the normal axial cutting feed command (step 1).

The interpolation processing part 12 calculates the movement speed for each axis, based on the resultant speed f of the movement speed for each movement axis, the movement end point (x, y, z, a) of each axis, the skip command control flag and other necessary conditions for axial movement, which are passed, in the same manner as the normal axial cutting feed command (step 2).

Then, the current value of each axis is compared with each end point coordinate (step 3). When the movement end point (x, y, z, a) of each axis is reached, the axial stop processing is performed, and execution of the command block is completed (step 10). Then, the next command block is dealt with.

Also, if the on the course of movement, the interpolation data for controlling the axial movement is created by calculating the movement speed and the residual movement distance to the end point for each axis and passed to the next axial control processing part 13 together with the skip command control flag (step 4).

The axial control processing part 13 calls the acceleration or deceleration parameters from the set parameter holding memory 18, based on the skip control flag, to perform the acceleration or deceleration processing for each axis to reach the target speed f, when the initial acceleration or deceleration pattern and parameters or the acceleration or deceleration parameters (acceleration or deceleration pattern, time constant, etc.) corresponding to the plural skip signals are set as described in connection with FIG. 5 (step 5).

The acceleration or deceleration processing when the acceleration or deceleration parameters (acceleration or deceleration pattern, time constant, slope, etc.) corresponding to the plural skip signals as described above in connection with FIG. 5 are set up has the speed command waveform as shown in FIG. 4A, when the acceleration or deceleration parameters with the fixed time constant are set up, or the speed command waveform as shown in FIG. 4B, when the acceleration or deceleration parameters with the fixed slope are set up.

And the interpolation data subjected to the acceleration or deceleration processing is output to the servo amplifier 19 or the principal axis amplifier 20 for each axis to move the axis using the servo motor 21 or the principal axis motor 22. Meanwhile, an input signal from the sensor 30 is checked (step 6). If there is no input signal from the sensor 30, the operation returns to the interpolation processing part 12, where after moving the axes, the updated current value and the end coordinates are compared (step 3). If reached, the operation transfers to the axis stop processing (step 10), or if during movement, the new interpolation data is created (step 4).

When an input signal is entered while the axial control processing part 13 is outputting the axial movement to the servo amplifier 19 or the principal axis amplifier 20, the specified value fc of speed corresponding to the input sensor number c is firstly set (step 7).

Then, it is checked whether or not the specified value fc of speed that is set up is "0" (step 8). If not "0", the sensor signal is regarded as changing the axial movement speed, in which the residual movement distance to the axial movement end point is updated, and the operation returns to the interpolation processing 12. In the interpolation processing part 12, the next interpolation data is created based on the residual movement distance and the new axial movement speed (steps 3, 4, 5).

In the axial control processing part 13, when the specified value fc of speed corresponding to the input sensor number c is "0", the input from the sensor 30 is regarded as stopping, and the residual movement distance for each axis is canceled and the skip processing is performed in the same manner as the conventional skip processing (step 9).

After the axis is stopped, the block for skip command is completed, and the operation transfers to the next block (step 10).

Accordingly, when the previous skip command (1), namely, $$\text{Ggg Xx Yy Zz Ff F4=f4 F3=f3 F2=f2 F1=f1;} \quad (1)$$

(where f>f4>f3>f2, f1=0, and F1, F2, F3 and F4 correspond to the skip signals 1 to 4, respectively) is executed, the axial movement speed command waveform as shown in FIG. 3A is produced.

Also, when the previous skip command (2), namely, $$\text{Ggg Xx Yy Zz Ff F4=f3 F3=f4 F2=f2 F1=f1;} \quad (2)$$

(where f>f4>f3>f2, f1=0, and F1, F2, F3 and F4 correspond to the skip signal 1 to 4, respectively) is executed, the axial movement speed command waveform as shown in FIG. 3B is produced.

When a skip stop sensor signal (skip signal 1) is input, the axis stop processing involves stopping the axis at a position loop time constant close to the step stop to make the stop position accurate in the same manner as the conventional skip processing.

Also, when the acceleration or deceleration parameters with fixed time constant are set in the set data holding memory 18 as previously described, the axial movement speed command waveform is produced as shown in FIG. 4A. Or when the acceleration or deceleration parameters with fixed slope are set in the set data holding memory 18, the axial movement speed command waveform is produced as shown in FIG. 4B.

Accordingly, in the case where with a plurality of skip signals (external signals), it is desired to move the tool to the final specified position by decreasing stepwise, or increasing or decreasing stepwise the speed, every time the skip signal is input into the numerical control apparatus, the numerical control apparatus enables the processing program to be produced easily in this embodiment 1.

Also, since the axis is not stopped in making the acceleration or deceleration control, the operation time is shortened.

Also, since the acceleration or deceleration parameters with fixed time constant or fixed slope are specified at will for each skip signal, the optimal acceleration or deceleration method for implementing the fast and smooth acceleration or deceleration is provided.

INDUSTRIAL APPLICABILITY

As described above, the numerical control apparatus according to this invention is suitably employed to perform the skip function.

The invention claimed is:

1. A numerical control apparatus comprising:
   a memory storing a numerical control processing program having at least one block;
   an input module receiving, from a device external to the numerical control apparatus, a skip command;
   a processing module executing the received skip command instead of one block of the processing program, wherein the skip command issues a plurality of skip signals, the plurality of skip signals specify feed speeds different from a feed speed of a normal feed speed command in the one block of the processing program; and
   a control module executing at least one of an acceleration control and a deceleration control upon an input of said plurality of skip signals from the processing module.

2. A numerical control apparatus comprising:
   a memory storing a numerical control processing program having at least one block, each of the at least one block having a normal feed speed command and end point coordinates of a control axis;
   an input module receiving, from a device external to the numerical control apparatus, a skip command;
   a processing module executing the received skip command instead of one block of the processing program, wherein the skip command issues a plurality of skip signals, the plurality of skip signals specify feed speeds different from a feed speed of the normal feed speed command in the one block of the processing program; and
   control module executing at least one of an acceleration control and a deceleration control upon an input of said plurality of skip signals from the processing module.

3. The numerical control apparatus according to claim 1 or 2, wherein said plurality of skip signals for commanding the feed speeds designate a percentage of the feed speed of the normal feed speed command.

4. The numerical control apparatus according to claim 1 or 2, further comprising a setting memory area storing a plurality of acceleration or deceleration parameters corresponding to said plurality of skip signals, wherein said control module executes one of the acceleration and the deceleration control corresponding to said plurality of skip signals based on said stored acceleration or deceleration parameters.

* * * * *